US008885738B2

(12) United States Patent
Cohen et al.

(10) Patent No.: US 8,885,738 B2
(45) Date of Patent: Nov. 11, 2014

(54) UNIFIED SINGLE AND MULTIPLE CARRIER RECEIVER ARCHITECTURE

(75) Inventors: Yossef Cohen, Nofit (IL); Noam Galperin, Ma'alot (IL); Eshel Hason, Nesher (IL)

(73) Assignee: CSR Technology Inc., San Jose, CA (US)

(*) Notice: Subject to any disclaimer, the term of this patent is extended or adjusted under 35 U.S.C. 154(b) by 912 days.

(21) Appl. No.: 12/412,262

(22) Filed: Mar. 26, 2009

(65) Prior Publication Data

US 2009/0244399 A1  Oct. 1, 2009

Related U.S. Application Data

(60) Provisional application No. 61/039,665, filed on Mar. 26, 2008.

(51) Int. Cl.
*H04L 27/28* (2006.01)
*H04N 5/44* (2011.01)
*H04N 21/426* (2011.01)

(52) U.S. Cl.
CPC ........... *H04N 5/44* (2013.01); *H04N 21/42607* (2013.01)
USPC ........................................................ 375/260

(58) Field of Classification Search
CPC .............. H04B 1/02; H04B 1/04; H04B 1/10; H04B 1/38; H04B 1/69; H04K 1/10; H04K 9/00; H04L 27/06; H04L 27/22; H04L 27/28
USPC ......... 375/222, 260, 326, 344, 135, 229, 261, 375/295, 316, 340, 343, 346, 348, 350; 342/196, 378; 348/725, 726; 370/203, 370/208, 209, 210, 297, 328, 329, 389; 455/103
See application file for complete search history.

(56) References Cited

U.S. PATENT DOCUMENTS

| | | | |
|---|---|---|---|
| 2005/0100118 A1* | 5/2005 | Zhang ............................ 375/343 |
| 2005/0157821 A1* | 7/2005 | Kim et al. ...................... 375/326 |
| 2005/0286619 A1* | 12/2005 | Haddadin et al. .............. 375/222 |
| 2006/0075010 A1* | 4/2006 | Wadleigh et al. ............. 708/404 |
| 2006/0093051 A1* | 5/2006 | Hou ............................... 375/260 |
| 2006/0159187 A1* | 7/2006 | Wang et al. .................... 375/260 |
| 2006/0291578 A1* | 12/2006 | Singh et al. .................... 375/260 |
| 2007/0104280 A1* | 5/2007 | Ibrahim et al. ................ 375/260 |
| 2008/0232483 A1* | 9/2008 | Yang et al. ..................... 375/260 |
| 2008/0304584 A1* | 12/2008 | Nishio et al. ................... 375/260 |
| 2009/0060101 A1* | 3/2009 | Liu ................................ 375/344 |

OTHER PUBLICATIONS

Standardization Administration of the People's Republic of China, "GB 20600-2006, Chinese National Standard; Framing Structure, Channel Coding and Modulation for Digital Television Terrestrial Broadcasting System," published Aug. 18, 2006, 133 pages.

(Continued)

*Primary Examiner* — Sam K Ahn
*Assistant Examiner* — Shawkat M Ali
(74) *Attorney, Agent, or Firm* — John W. Branch; Lowe Graham Jones PLLC (57) ABSTRACT

A device and method for receiving and processing single carrier and multiple carrier signals through substantially common elements within a receiver that uses a radix 2 FFT on the signal, equalizes both types of signals in the frequency domain and then, for the multiple carrier signal performs a polynomial interpolation to bring the signal to symbol rate and for the single carrier signal performs an IFFT and samples the output to produce a signal at symbol rate.

19 Claims, 5 Drawing Sheets

(56) References Cited

OTHER PUBLICATIONS

Jian Fu et al., "Low-Complexity Equialization for TDS-OFDM Systems Over Doubly Selective Channels," IEEE Transactions on Broadcasting, vol. 51, No. 3, Sep. 2005, pp. 401-407.

Bertrand Muquet et al., "Cyclic Prefixing or Zero Padding for Wireless Multicarrier Transmissions?" IEEE Transactions on Communications, vol. 50, No. 12, Dec. 2002, pp. 2136-2148.

Jun Wang et al., "Iterative Padding Subtraction of the PN Sequence for the TDS-OFDM over Broadcast Channels," IEEE Transactions on Consumer Electronics, vol. 51, No. 4, Nov. 2005, pp. 1148-1152.

* cited by examiner

UNIFIED SINGLE AND MULTIPLE CARRIER RECEIVER ARCHITECTURE

CROSS-REFERENCE TO RELATED APPLICATIONS

This application claims benefit of U.S. Provisional Application No. 61/039,665 filed on Mar. 26, 2008, the contents of which are incorporated by this reference.

FIELD OF THE INVENTION

The invention relates generally to the processing of broadcast television signals. More specifically, the invention relates to the receiving and processing of television broadcast signals that include either a single carrier signal or multiple carrier signal.

BACKGROUND OF THE INVENTION

DMB-T/H or DTMB (GB 20600-2006) is a digital terrestrial television Standard that is mandatorily applied in the People's Republic of China (PRC), including Hong Kong (referred to as the "Standard"). This mandatory Standard covers both fixed and mobile terminals devices, and may eventually serve more than half of the television viewers in the PRC, especially those in suburban and rural areas. The Standard uses two alternative modulation schemes: TDS-OFDM (Time Domain Synchronous-Orthogonal Frequency Division Multiplexing) which is a multi-carrier modulation scheme; and QAM (Quadrature Amplitude Modulation) which is a single-carrier modulation scheme.

The Standard generally defines the framing structure, channel coding and modulation for a digital television terrestrial broadcasting system. The technology of the Standard includes such things as pseudo number sequence frame headers which can be used for fast synchronization and high efficiency channel estimation/equalization and forward error correction (low density parity checking and BCH code). The Standard can support payload data rates of 4.813 Mbps to 32.486 Mbps, SDTV, HDTV, mobile and stationary reception, multi frequency networks and single frequency networks.

The Standard, according to one of the co-developers, is capable of transmitting "acceptable" signal qualities for an HDTV receiver moving at 200 km/h speed. The Standard also has the support of mobile digital TV service on handhelds which is absent from typical digital TV implementations in Europe and America. In addition to these, the radius of the area with signal coverage using the Standard is 10 km longer than the European implementation. Despite the advantages, there are also short comings of the Standard. As the Standard supports both single-carrier and multi-carrier modulation schemes, as well as not defining the default video encoding Standards, the research and development costs and complexity of the chip integrated circuits for this Standard are more significant, leading to more expensive receiver products.

Typically, receivers that support reception of both single carrier and multi-carrier signals, require more hardware components than receivers that can implement only one of the two types of signals. However, two completely separate receiver circuits are not necessarily required to implement all of the operations for processing broadcast modes of television signals that include either single carrier or multiple carrier signals. For example, since each of the two broadcast modes for either the single carrier or multiple carrier signals require substantially similar demodulation, forward error correction and symbol de-interleaving processes, some of the hardware and software components for processing the single carrier or multiple carrier signals could potentially be shared between two receivers. However, in the past, other operations for completing the processing for the two modes of broadcast television signals have employed separate equalizer circuits which are typically the largest sections/components of a receiver.

Differently arranged equalizers are typically provided to separately process single carrier or multiple carrier signals for broadcast television signals. For example, a receiver for processing multiple carrier signals usually includes a frequency domain equalizer that is based on a specialized mixed radix 3780 FFT (Fast Fourier Transform) engine for a FFT length of 3780 in combination with a complex division unit. However, such receivers arranged for processing multiple carrier signals often suffer from performance limitations in rejecting high bandwidth phase noise, which can be expensive to minimize. Alternatively, a receiver separately arranged to process single carrier signals for broadcast television signals usually includes a time domain equalizer that is based on relatively long and complex digital filters arranged in both feed-forward and feed-back formations.

Also, at least one drawback to a receiver that includes the 3780 FFT engine is its complexity and relatively high cost in comparison to other components included with the receiver. Thus, it would be advantageous to have a receiver arranged as an integrated circuit that is capable of processing both the single carrier and multiple carrier signals for broadcast television signals, and in which a substantial amount of such processing takes place with common components that do not make use of a 3780 FFT engine.

BRIEF DESCRIPTION OF THE DRAWINGS

Non limiting and non exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Embodiments, which is to be read in association with the accompanying drawings, wherein.

DETAILED DESCRIPTION OF THE EMBODIMENTS

The invention is described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the invention may be embodied as methods or devices. Accordingly, the invention may take the form of an entirely hardware embodiment, an entirely software embodiment, an entirely firmware embodiment or an embodiment combining these different aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

The invention is directed to an apparatus and a method for receiving and processing broadcast television signals having either single carrier or multiple carrier signals. The invention provides for an architecture that enables substantially many of the same components and circuits to be employed for providing output data based on the processing, particularly equalization, of received broadcast television signals that include either single carrier or multiple carrier signals. Generally, the initial processing of the received broadcast television single carrier or multiple carrier signals includes demodulation, re-sampling, filtering, and decimation. Next, the single carrier or multiple carrier signals are processed by an equalizer that employs substantially the same components for equalization of the both types of signals. The equalized single or multiple carrier signals are subsequently employed to generate symbols at a predetermined rate as the output data signal for the receiver.

In at least one embodiment, the equalization processing includes zero padding of each frame body that includes a digital representation of the single carrier or the multiple carrier signals that are included with the received television broadcast signals, and performing a Fast Fourier Transform (FFT) on the zero padded frame body. In at least one embodiment, the zero padding adds trailing zeros to the frame body so that it can extend beyond 3,780 elements or samples, e.g., the zero padded frame body can include 8192 or 16384 elements. Also, at least one Fast Fourier Transform (FFT) method, e.g., Radix 2, and at least one division/conjugate multiplication computation algorithm are performed on the zero padded frame body to convert the signals into the frequency domain. The FFT method and the computation algorithm processing can provide the additional benefit of substantially cancelling the adverse effects of the channel impulse response.

Also, in at least one embodiment, the equalization processing of multiple carrier signals further includes performing polynomial interpolation to generate symbols at a predetermined rate as the receiver's output data signal. This polynomial interpolation processing can provide the additional benefit of relatively high band width phase noise rejection for the output data signal.

Alternatively, in at least one embodiment, the equalization processing for single carrier signals further includes performing at least one Inverse Fast Fourier Transform (IFFT) and subsequently generating a symbol rate signal at a predetermined rate as the receiver's output data. The IFFT converts the single carrier signals from the frequency domain back into the time domain, which is subsequently sampled and symbols are generated to provide the output data signal at the predetermined symbol rate.

Furthermore, in at least one embodiment, the receiver employs substantially the same hardware, software, firmware components or a combination thereof for processing received television broadcast signals that include either single carrier or multiple carrier signals to produce an output of data at a predetermined symbol rate. Further, although the components employed for frequency domain equalization for both single carrier and multiple carrier signals are substantially the same, the components are arranged to operate somewhat differently for single carrier signals versus multiple carrier signals.

Additionally, in at least one embodiment, once the single carrier signals are initially processed but before the equalization processing is provided, a pilot signal is removed. Next, the frequency domain equalization processing cancels the frame head, zero pads the frame body for the single carrier signals to either 8192 or 16384, and then performs an 8 k or 16 k Fast Fourier Transform (FFT) on the single carrier signals. Further, a division conjugate multiplication operation is performed on the single carrier signals with the channel frequency response. Also, for the single carrier signals, the output of the division conjugate multiplication operation can be Inverse Fast Fourier Transformed using an 8 k/16 k Inverse Fast Fourier Transform engine, where the first 3780 samples are taken from the output and compensated for high bandwidth phase noise to produce constellations output. The constellations output is symbol de-interleaved and forward error correction is performed to produce the output data signal.

Moreover, in at least one embodiment, for the multiple carrier signals, polynomial interpolation is performed on the output of the division conjugate multiplication operation to produce a constellations output in blocks of 3780.

Receiver Apparatus

Figure 1:
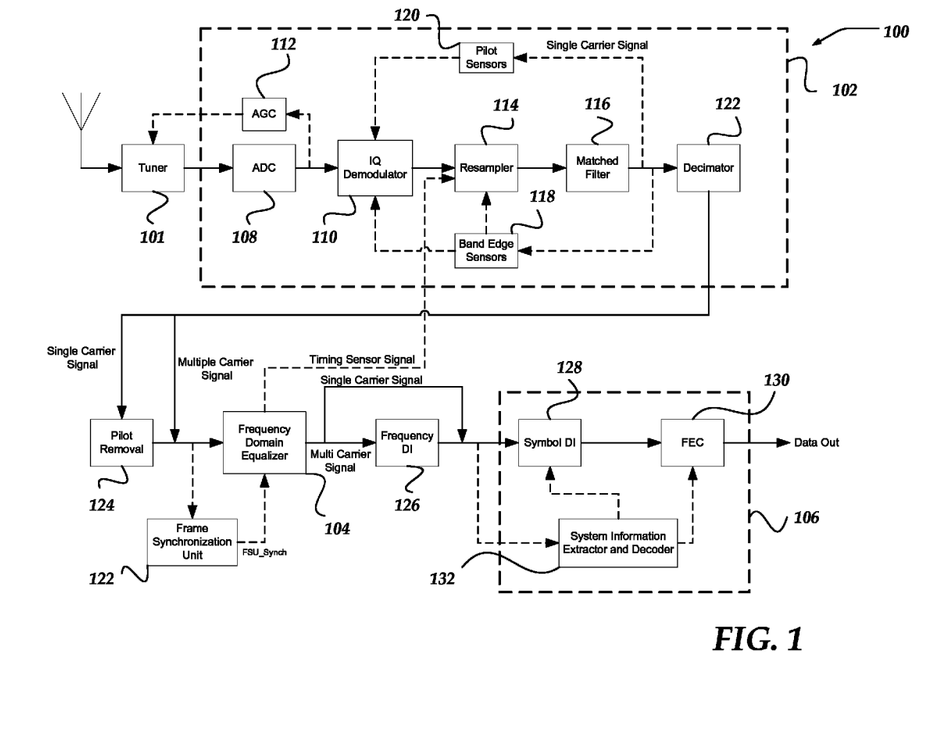
FIG. 1 shows a block diagram for an exemplary receiver adaptable for processing television signals having single carrier or a multiple carrier signals using a single, unified equalizer.

A block diagram of an exemplary receiver 100 is shown in FIG. 1. Receiver 100 may be considered as comprising several sections including receiving and processing section 102, frequency domain equalizer section 104 and output section 106. The single carrier and multiple carrier signals are processed in substantially the same manner within receiving and processing section 102 and output section 106, and thus these employ substantially common circuitry, components, and processes. The processes performed by receiving and processing section 102 and output section 106 can be operated and implemented in various ways with software, hardware, or a combination of both.

FIG. 1 shows one example for implementing receiving and processing section 102. Analog to digital converter ("ADC") 108 is arranged to sample an analog IF signal that is output from tuner 101 and centered at 36 MHz. The sampling takes place at 21 mega samples per second ("Msps"). Automatic gain control ("AGC") 112 provides feedback to tuner 101 based on a real-time calculation of the average power and peak magnitude of the analog IF signal. The signal is demodulated by IQ demodulator 110. Complex inverse quadrature demodulation of the signal to baseband is done by complex multiplication of the input signal x[n] by $e^{-j\theta n}$. The demodulation control loop (control of θ) is based on band-edge phase/frequency error sensors 118. These sensors work well for both kinds of signals, that is single carrier and multiple carrier signals. In the single carrier mode, pilots based sensors can also be used for that purpose.

Next, the signal is re-sampled to twice the symbol rate (7.56 MHz×2=15.12 MHz) in resampler 114 through a digital low pass filter to remove the image spectrum, followed by a FIFO that feeds a time-variant interpolation filter. The resampling rate control loop, the interpolation filter's coefficients and FIFO read control, is based on a band-edge timing offset sensor. This sensor works well for both kinds of signals, that is, single carrier and multiple carrier. After acquisition, fine timing control can be based on the channel impulse response ("CIR") calculation. After the resampling to twice the symbol rate, the signal is digitally filtered in matched filter 116 by a baseband square root raised cosine filter to remove the transmitter's ISI, and then decimated to symbol rate in decimator 122.

Figure 3:
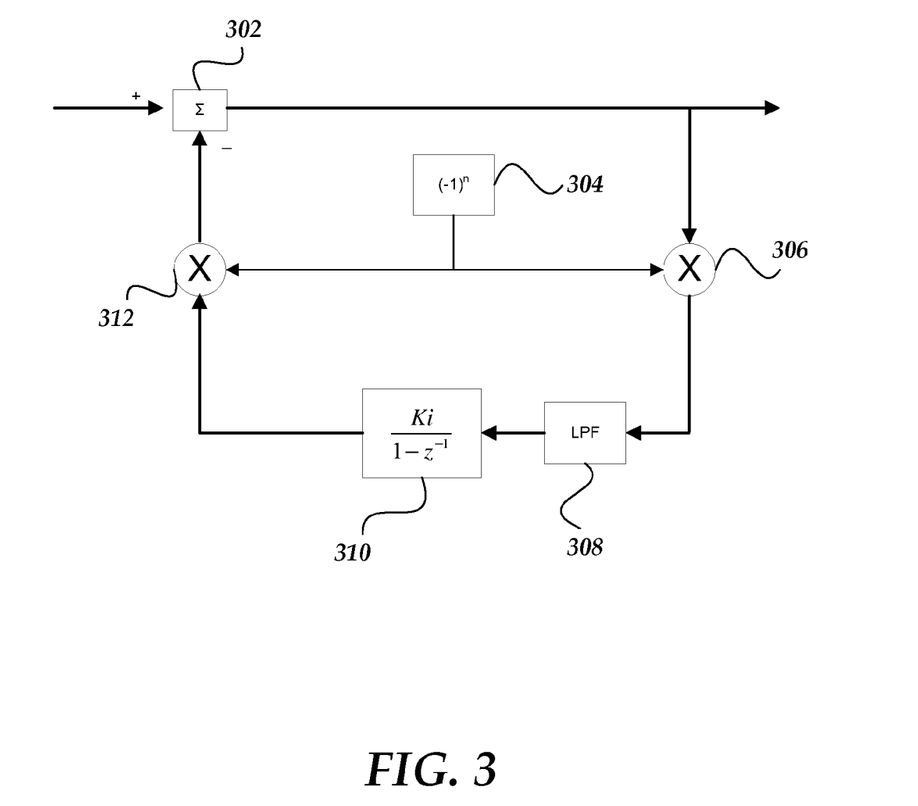
FIG. 3 shows a block diagram of an exemplary pilot signal removal control loop for use with the exemplary receiver.

FIG. 3 illustrates a control loop for sensing and removing pilot signals. Pilot signals that may have been added to the single carrier signal can be sensed at block 120 shown in FIG. 1 and subsequently removed as shown in pilot removal block 124. After pilot signal removal, the single carrier signal is then sent to frequency domain equalizer 104. The multiple carrier signal bypasses pilot removal block 124 and is sent directly into frequency domain equalizer 104.

A signal frame is the basic element of the system frame structure. A signal frame consists of two parts, a frame header and a frame body. The baseband symbol rates for both frame header and frame body are the same, and are defined as 7.56 Msps. The frame header uses a pseudo number sequence ("PN sequence"). The frame body consists of 36 system information symbols and 3744 data symbols, totaling 3780 symbols. The frame body has a duration of 500 μs (=3780/7.56). System information is used to provide the necessary demodulation and decoding information including constellation modes, low density parity checking rates, interleaving modes and frame body information.

After decimation of the multiple carrier signals and after removal of the pilot signal from the single carrier signal, frame synchronization unit ("FSU") 122 identifies the frame heads and sets boundaries between consequent signal frames. This is accomplished by correlation of the signal to the known PN sequence and tracking the correlation peaks by their values and locations. This generates a synchronization signal FSU_sync, which is input into the frequency domain equalizer 104.

The transmitter performs frequency interleaving in multiple carrier mode. Therefore, after processing by frequency domain equalizer 104 (discussed in detail below with respect to FIG. 2), the multiple carrier signal is processed by frequency de-interleaver 126. Each output block of the equalizer (y[n]. n~0 . . . 3779) is permuted to (z[n]. n~0 . . . 3779) according to the inverse of the permutation defined by the Standard. The single carrier signal bypasses frequency de-interleaver 126.

Next, the signals are processed by output section 106. One example of implementing output section 106 is shown in FIG. 1. The first 36 system information symbols in the block are decoded by block 132, and the decoded configuration data are used by symbol de-interleaver 128 and forward error correction block 130. In at least one embodiment, the block size of de-interleaver 128 is either 318,240 symbols or 954,720 symbols. The system information configuration data sets the block size, and symbol de-interleaving is performed as shown in block 128. Finally, the forward error correction mode is also determined from the system information, and is performed as shown in block 130.

Frequency Domain Equalization

Figure 2:
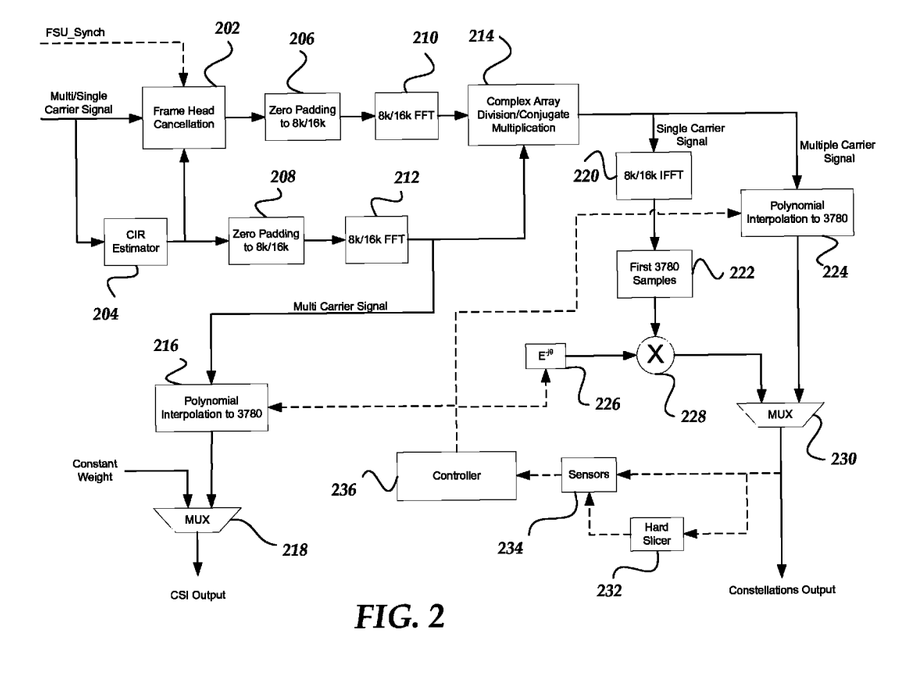
FIG. 2 illustrates a block diagram for an exemplary unified frequency domain equalizer for use with a unified receiver.

FIG. 2 is a block diagram illustrating further details of an exemplary equalizer such as shown in FIG. 1 by equalizer section 104. As shown, the single carrier or multiple carrier signals are input into Channel Impulse Response ("CIR") Estimator 204. The estimated channel impulse response in the discrete time domain can be calculated by least-square minimization of the following term:

$$(PN_{nominal\_toeplitz} \cdot CIR - PN_{received})^T \cdot (PN_{nominal\_toeplitz} \cdot CIR - PN_{received})$$

CIR and $PN_{received}$ are column vectors. $PN_{nominal\_toeplitz}$ is a Toeplitz matrix that contains values of the nominal PN sequence. The matrix is defined by its first row and its first column. The first matrix row is PN[CIRLen, CIRLen−I, . . . 1]. The first matrix column is PN[CIRLen, CIRLen+1, . . . , CIRLen+DataLen−1], where CIRLen is the length of the CIR vector and DataLen is the length of the $PN_{received}$ vector. The solution takes the form of $CIR = B \cdot PN_{received}$ where B is a CIRLen×DataLen complex matrix.

Figure 4:
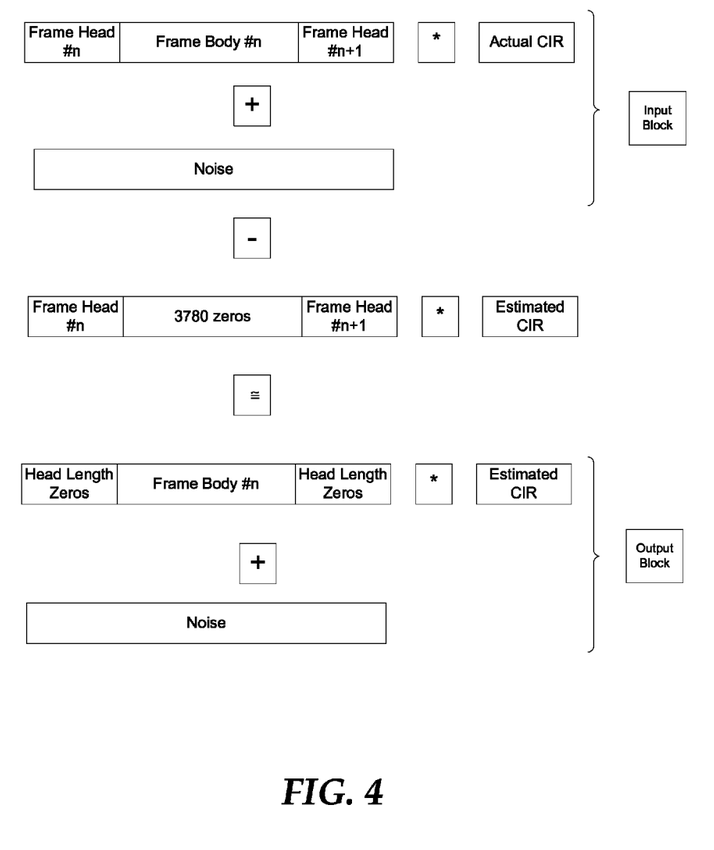
FIG. 4 illustrates a flow chart for frame head cancellation.

After calculation of the estimated CIR, the frame head is cancelled in frame head cancellation block 202. The single carrier or multiple carrier signals are input into frame head cancellation block 202 along with the FSU_Sync signal generated from frame synchronization unit 122 and the estimated CIR from CIR estimator 204. As shown in FIG. 4, the PN sequence can be subtracted from the received signal block which results in the frame head appearing as if the transmitted PN sequence was a sequence of zeros.

With the PN sequence subtracted from the single carrier or multiple carrier signal, the linear CIR convolution is the same as a cyclic convolution. Both the estimated CIR and the signal frame body are padded with zeros to, as an example, to 8192 or 16384 samples/elements, as shown in blocks 206 and 208, and an 8K/16K fast Fourier transform is performed on both padded series as shown in blocks 210 and 212. The equalization (CIR effect cancellation) is performed by complex array division/conjugate multiplication in block 214 in the frequency domain by complex division, which is sample by sample: Z[n]~X[n]/Y[n], of the FFT of the padded signal frame body by the FFT of the padded estimated CIR.

In the single carrier mode, the division result of the FFTs is fed to an IFFT engine 220, and the first 3780 elements of the IFFT result are taken as shown in block 222. For high band width phase noise compensation, decision directed phase error feedback drives an additional phase rotator that tilts the IFFT result as shown in blocks 226 and 228.

For the multiple carrier signal, one method is to follow the same process performed for the single carrier signal, and then perform an additional 3780 long FFT. This is somewhat equivalent to resampling the 8K/16K FFT result to 3780 equally spaced samples using a Dirichlet kernel, which is the usual known resampling kernel for periodic signals. However, in series longer than 7560 samples, the spectrum of the signal is within the range [−π,π] (it is actually within the range of [−π,0]), so a sampling and reconstruction theorem may be used. As one example, a low pass filter such as the sine function or the raised cosine function may be used as the reconstruction kernel. The 8K/16K division result, which is the output of the complex array division/conjugate multiplication in block 214, is re-sampled using polynomial interpolation of the time varying finite impulse response approximation of the desired reconstruction kernel, as shown in block 224. In other words, the output of the division/conjugate multiplication in block 214 (which has frequency spacing of either 7.56 MHz/8 k or 7.56 MHz/16 k) is approximated through the use of a polynomial resampling filter which is then used to re-sample the frequency domain signal to the desired frequency spacing of 7.56 MHz/3780 Hz. The frequency variable of the polynomial kernel is controlled by a decision directed timing sensor (which timing variable is replaced by the frequency ones) to compensate for high band width inter carrier interference.

Channel state information ("CSI") is transferred to the FEC block with the equalizer's constellations output for better performance. To pass the Channel State Information to the FEC block, the 8K/16K FFT result of the CIR (henceforth CFR: Channel Frequency Response) itself is also interpolated with the same frequency variable as the constellations in block 216. In multiple carrier mode with 4QAM/4QAM-NR mapping, the magnitude of the constellations bears no data. The more relevant property is the constellation's phase. In multiple carrier mode with 4QAM/4QAM-NR mapping, the complex division unit can avoid the division by $|CFR|^2$ and remain with the multiplication by the complex conjugate of CFR. (Complex division by CFR is done by multiplication of the data by the complex conjugate of CFR, and division of the result by the real term squared absolute value of CFR.) In this case the equalization is done with a channel matched filter ("CMF"), which maximizes the signal to noise ratio according to Wiener. In this case, the CSI is already incorporated in the constellations (constellations with lower magnitude have lower weights) so the CSI output to the FEC is constant, as it would be in the single carrier mode.

Figure 5:
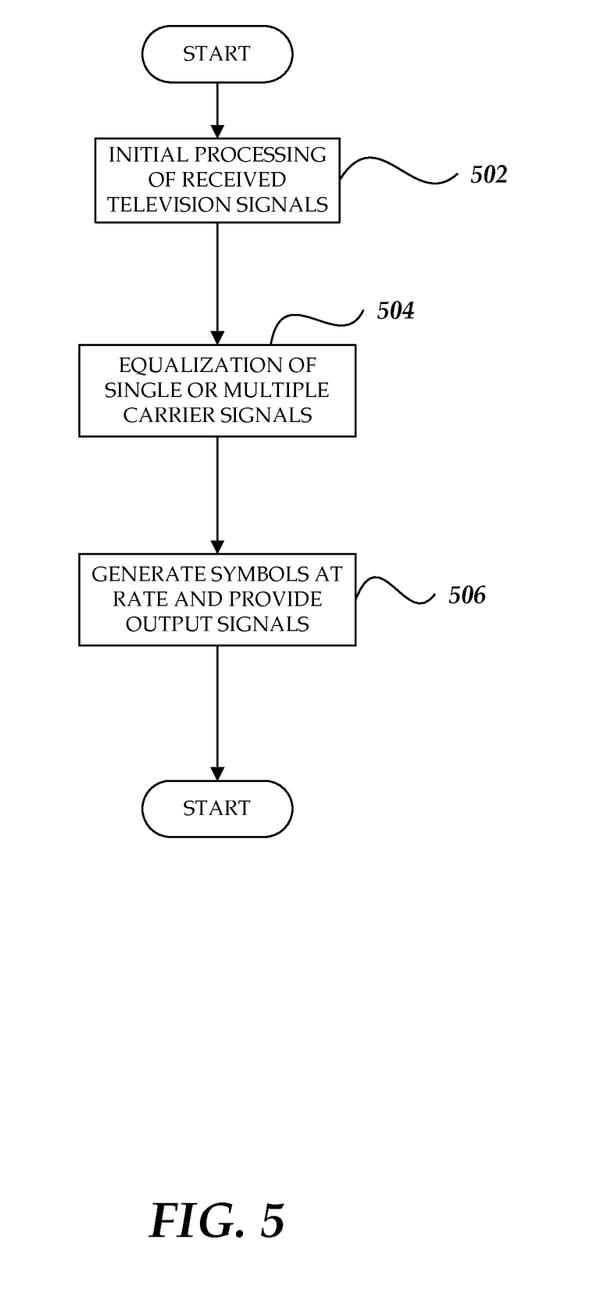
FIG. 5 shows a flow chart for processing received television broadcast signals in accordance with the invention.

FIG. 5 illustrates a flow chart of the process for processing received multiple and single carrier signals for broadcast television. Moving from a start block to block 502, the received broadcast television signal is initially processed. The initial processing may include demodulation, re-sampling, filtering, and decimation of the received signal to generate an intermediate output signal for further processing, such as equalization. Optionally, if the received signal is arranged to include a single carrier signal and a pilot signal, then the pilot signal is removed.

After the initial processing of the received signal is performed to generate the intermediate output signal (which may include the removal of a pilot signal included with a single carrier signal), the process steps to block 504 where the intermediate output signal is equalized. As discussed in greater detail above, the equalization processing of the intermediate output signal employs substantially the same components to equalize both single carrier and multiple carrier signals.

After the intermediate output signal is equalized, the process flows to block 506, where the equalized single or multiple carrier signals are subsequently sampled and employed to generate symbols at a predetermined rate as the output data signal for the receiver. Next, the process returns to performing other actions.

While the invention has been described above in connection with what is presently considered to be the most practical and preferred embodiments, it is to be understood that the invention is not limited to the disclosed embodiment but instead intended to cover various modifications and equivalent arrangements included within the spirit and scope of the appended claims.

What is claimed is:

1. An apparatus for providing an output data signal based on a received television analog signal that includes a single carrier signal and a received television analog signal that includes a multiple carrier signal, the apparatus comprising:
   (a) a receiving section configured to convert each received television analog signal into an intermediate output signal and further configured to process each intermediate output signal that includes the single carrier signal and each intermediate output signal that includes the multiple carrier signal;
   (b) an equalizer section configured to:
      equalize the intermediate output signal in a frequency domain, wherein the frequency domain equalization is performed on each intermediate output signal that includes the single carrier signal and is performed on each intermediate output signal that includes the multiple carrier signal,
      add zero padding to at least one frame body that includes 3780 samples and is included in the single carrier signal and add zero padding to at least one frame body that includes 3780 samples and is included in the multiple carrier signal prior to employing each of a plurality of same Radix-2 fast Fourier transform (FFT) components to equalize the single carrier signal and the multiple carrier signal, wherein the zero padding extends a number of samples included in the at least one frame body to equal a power of two that is greater than the 3780 samples, and
      perform polynomial interpolation on the padded multiple carrier signal to reduce the number of samples to 3780 samples based on a polynomial resampling of a result of a complex division/conjugate multiplication performed on the padded multiple carrier signal; and
   (c) an output section that is operative to employ the equalized intermediate output signal to generate symbols at a 7.56 Msps rate as the output data signal.

2. The apparatus of claim 1, wherein the receiving section is further arranged to at least demodulate, sample, filter, and decimate the received analog signal.

3. The apparatus of claim 1, wherein the equalizer section performs frequency domain equalization by performing at least one FFT on each intermediate output signal that includes the single carrier signal and the equalizer section performs frequency domain equalization by performing at least one FFT on each intermediate output signal that includes the multiple carrier signal.

4. The apparatus of claim 1, wherein the equalization section performs at least an Inverse Fast Fourier Transform (IFFT) on the intermediate output signal that includes the single carrier signal to produce a constellations output at the 7.56 Msps symbol rate.

5. The apparatus of claim 1, wherein the output section is further configured to:
   receive a constellations output at the 7.56 Msps symbol rate from the equalizer section; and
   process the received constellations output by performing at least symbol de-interleaving and forward error correction (FEC), wherein the processed constellations output is employed in the generation of the output data signal.

6. The apparatus of claim 1, wherein the equalizer section is further configured to process the intermediate output signal to cancel a channel impulse response (CIR).

7. The apparatus of claim 1, further comprising a pilot removal section for removing a pilot signal from the intermediate output signal that includes a single carrier signal.

8. The apparatus of claim 1, further comprising a frame section that is configured to remove a frame head from a frame body provided for the output data signal.

9. The apparatus of claim 1, further comprising a compensation section that is configured to compensate the intermediate output signal that includes the single carrier signal for high band width phase noise through phase error feedback.

10. The apparatus of claim 1, wherein the apparatus is arranged as an integrated circuit.

11. A method for providing an output data signal based on a received television analog signal that includes a single carrier signal and a received television analog signal that includes a multiple carrier signal, the method comprising:
   (a) converting each received television analog signal into an intermediate output signal and further processing each intermediate output signal that includes the single carrier signal and each intermediate output signal that includes the multiple carrier signal;

(b) equalizing each intermediate output signal by:

equalizing each intermediate output signal in a frequency domain, wherein the frequency domain equalization is performed on each intermediate output signal that includes the single carrier signal and the frequency domain equalization is performed on each intermediate output signal that includes the multiple carrier signal, adding zero padding to at least one frame body that includes 3780 samples and is included in the single carrier signal and adding zero padding to at least one frame body that includes 3780 samples and is included in the multiple carrier signal prior to employing each of a plurality of same Radix-2 fast Fourier transform (FFT) components that are equalizing the single carrier signal and the multiple carrier signal, wherein the zero padding extends a number of samples included in the at least one frame body to equal a power of two that is greater than the 3780 samples, and performing polynomial interpolation on the padded multiple carrier signal to reduce the number of samples to 3780 samples based on a polynomial resampling of a result of a complex division/conjugate multiplication performed on the padded multiple carrier signal; and (c) employing the equalized intermediate output signal to generate symbols at a 7.56 Msps rate as the output data signal.

12. The method of claim 11, further comprising at least demodulating, sampling, filtering, and decimating the received analog signal.

13. The method of claim 11, further comprising performing at least one (FFT) on each intermediate output signal that includes the single carrier signal and performing at least one (FFT) on each intermediate output signal that includes the multiple carrier signal.

14. The method of claim 11, further comprising performing at least an inverse Fast Fourier Transform (IFFT) on the intermediate output signal that includes the single carrier signal to produce a constellations output at the 7.56 Msps symbol rate.

15. The method of claim 11, further comprising processing a constellations output by performing at least symbol de-interleaving and forward error correction (FEC), wherein the processed constellations output is employed in the generation of the output data signal.

16. The method of claim 11, further comprising processing the intermediate output signal to cancel a channel impulse response (CIR).

17. The method of claim 11, further comprising removing a pilot signal from the intermediate output signal that includes a single carrier signal.

18. The method of claim 11, further comprising removing a frame head from a frame body that is provided for the output data signal.

19. The method of claim 11 further comprising compensating the intermediate output signal that includes the single carrier signal for high band width phase noise through phase error feedback.

* * * * *